Figure 1:
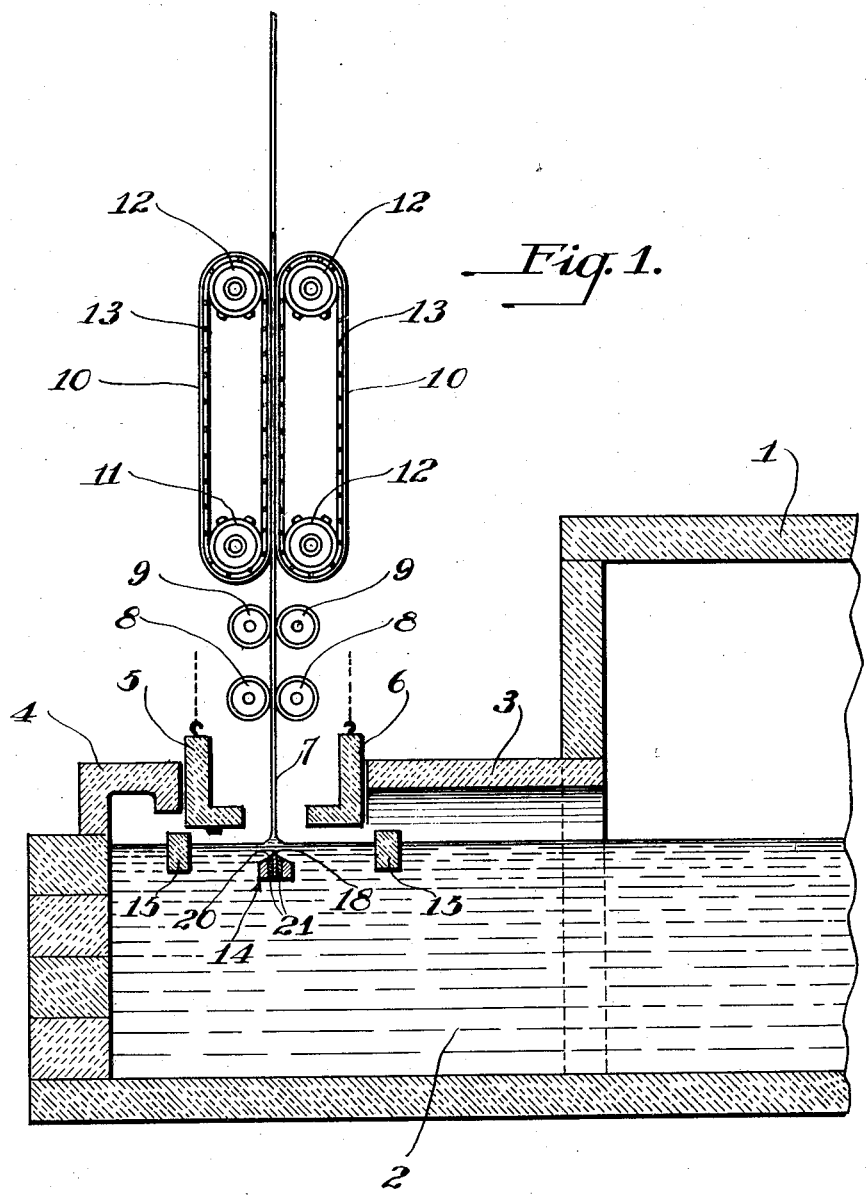

June 7, 1927. 1,631,319

J. S. GREGORIUS

APPARATUS FOR DRAWING SHEET GLASS

Filed Oct. 21, 1926 2 Sheets-Sheet 1

INVENTOR

June 7, 1927. 1,631,319
J. S. GREGORIUS
APPARATUS FOR DRAWING SHEET GLASS
Filed Oct. 21, 1926 2 Sheets-Sheet 2
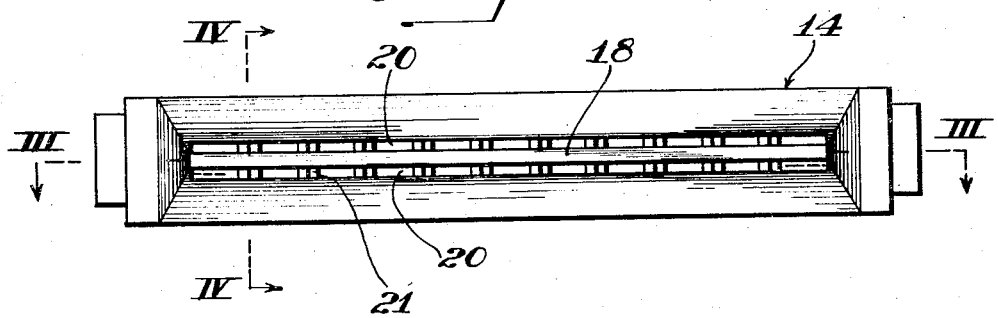
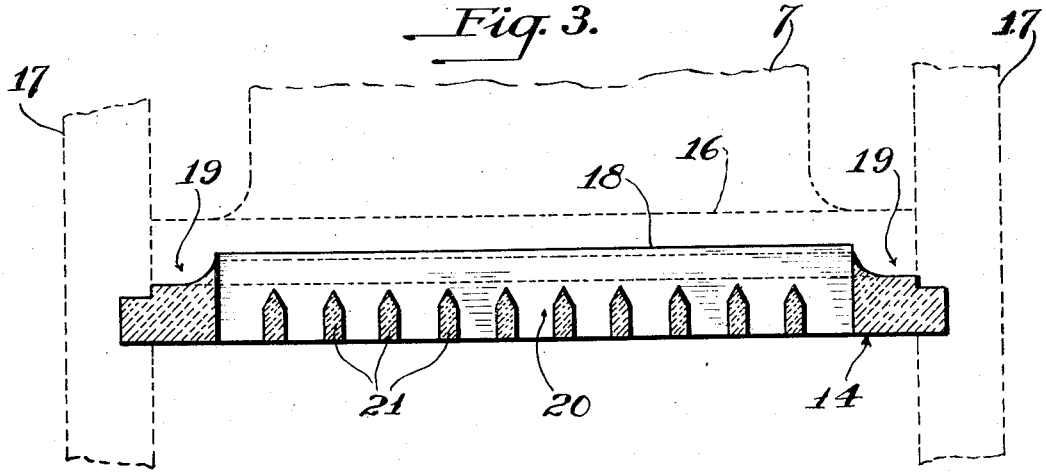
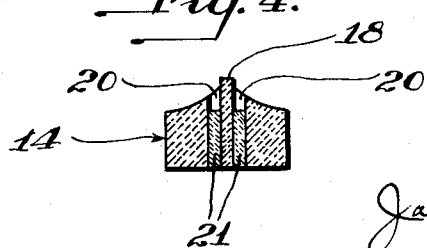
INVENTOR Patented June 7, 1927.

1,631,319

UNITED STATES PATENT OFFICE.

JOSEPH S. GREGORIUS, OF MOUNT VERNON, OHIO, ASSIGNOR TO PITTSBURGH PLATE GLASS COMPANY, A CORPORATION OF PENNSYLVANIA.

APPARATUS FOR DRAWING SHEET GLASS.

Application filed October 21, 1926. Serial No. 143,113.

The invention relates to apparatus for use in connection with a vertical sheet drawing operation. It has for its principal objects the provision of an improved draw bar for use in the glass bath adapted; (1) to reduce the tendency toward devitrification, which occurs more or less above the ordinary solid or slotted draw bar; (2) to more positively define the position of the sheet in the bath, and maintain such sheet flatter than has been done by the draw bars heretofore employed; and (3) to assist in maintaining the temperature of the layer of glass above the bar, from which the sheet is generated, more uniform from one side of the bath to the other. One embodiment of the invention is shown in the accompanying drawings, wherein:

Figure 1 is a vertical section taken through the drawing tank. Fig. 2 is a plan view of the draw bar. Fig. 3 is a section on the line III—III of Fig. 2. And Fig. 4 is a section on the line IV—IV of Fig. 2.

Referring to the drawings, 1 is the melting tank, which may be of any improved form, and which is provided with the usual regenerative heating means, and 2 is the drawing tank. The drawing tank is capped with the arch 3 at the end adjacent the melting tank and with the block 4 adjacent the rear end of the drawing tank. A pair of shielding members 5 and 6, L-shaped in cross section, are provided on opposite sides of the sheet 7 which is drawn upward continuously from the glass bath. The apparatus for pulling the sheet upward continuously constitutes no part of the present invention, and is merely shown diagrammatically. Any suitable drawing means may be employed for drawing the sheet upward in a continuous ribbon, the glass being severed into sections above the drawing means. As shown, the drawing means comprises the opposing driven rolls 8, 8 and 9, 9 and the endless asbestos belts 10, 10. The rolls 8, 8 and 9, 9 are covered with asbestos and press yieldingly against the sides of the sheet. The endless belts 10, 10 pass around suitable pulleys mounted on the shafts 11, 11 and 12, 12. One set of these shafts is driven by suitable means and the other set are driven from such set by means of the chains 13, 13 passing around suitable sprockets on the ends of the shafts. Located in the bath beneath the line of generation of the sheet is the draw bar 14, to which the improvement particularly relates, and on either side of this draw bar are the usual skim bars 15, 15.

The dotted lines in Fig. 3 serve to indicate the location of the draw bar with respect to the glass level 16 and with respect to the side walls 17, 17 of the drawing tank, in which the ends of the draw bar are seated, the base of the sheet 7 being also shown in dotted lines. In operation, the top of the bar will be about 2 inches below the level 16 of the glass bath. The bar is made of clay and is provided with a central longitudinal rib 18, which rib is preferably about 1 inch in thickness and is cut away at the ends of the bar, as shown at 19, 19 so that the rib terminates short of the side walls 17 of the furnace. This serves to give somewhat hotter glass at the edges of the sheet and above the cut away parts 19, 19 where there is normally a tendency of the glass to become too stiff and cool. On each side of the rib 18 is a longitudinal slot 20, 20 extending the length of such rib. As the rib 18 is relatively thin, it is necessary to support it against warping and cracking and this is accomplished by the provision of the plurality of transverse webs 21, 21, 21, etc., which have their upper ends tapered or picketed and terminating about 3 inches below the upper edge of the rib 18. The rib 18, because of its thinness, very positively defines the position of the sheet lying thereabove, as the tendency of the sheet is to maintain itself in alignment with this rib, the glass being cooler directly above this rib than it is on each side thereof. The webs 21 are made to terminate considerably below the level of the top of the rib 18 in order to prevent alternate areas of chill and heat, such as would occur if these webs extended up to the level of the top of the rib. The tapering or picketing of the top of the webs also assists in preventing this alternate chill and heat. The radiant heat of the glass beneath the bar passing through the two slotted areas tends to decrease the speed of devitrification formation above the bar without sacrificing a clean-cut definition of the sheet, the central rib 18 serving to secure this function, as above pointed out. It will be understood that the construction shown is capable of considerable modification without departing from the primary inventive idea involved, which calls merely for the central defining rib with a slot on each side thereof. The dimensions given may also be varied to meet requirements, the bar as shown being designed for a tank which is about 6 feet in width from side wall to side wall.

What I claim is:

1. In combination in apparatus for drawing sheet glass, a glass drawing tank adapted to carry a bath of molten glass from which a sheet is to be drawn, means for drawing a sheet of glass upward from the bath with its plane of generation lying transversely of the bath, and a clay bar lying beneath the surface of the glass in alinement with the line of generation of the sheet, and provided with a central longitudinal rib, and with a slot extending through the bar on each side of said rib and parallel thereto.

2. In combination in apparatus for drawing sheet glass, a glass drawing tank adapted to carry a bath of molten glass from which a sheet is to be drawn, means for drawing a sheet of glass upward from the bath with its plane of generation lying transversely of the bath, and a clay bar lying beneath the surface of the glass in alinement with the line of generation of the sheet, having a pair of vertical slots through the bar extending longitudinally thereof, with a longitudinal rib therebetween, and a plurality of short transverse ribs bridging the space between said first rib and the body of the block on the outer sides of the slots.

3. In combination in apparatus for drawing sheet glass, a glass drawing tank adapted to carry a bath of molten glass from which a sheet is to be drawn, means for drawing a sheet of glass upward from the bath with its plane of generation lying transversely of the bath, and a clay bar lying beneath the surface of the glass in alinement with the line of generation of the sheet, having a pair of vertical slots through the bar extending longitudinally thereof, with a longitudinal rib therebetween, and a plurality of short transverse ribs bridging the space between said first rib and the body of the block on the outer sides of the slots, said transverse ribs terminating at their upper sides below the top of said longitudinal rib.

4. In combination in apparatus for drawing sheet glass, a glass drawing tank adapted to carry a bath of molten glass from which a sheet is to be drawn, means for drawing a sheet of glass upward from the bath with its plane of generation lying transversely of the bath, and a clay bar lying beneath the surface of the glass in alinement with the line of generation of the sheet, having a pair of vertical slots through the bar extending longitudinally thereof, with a longitudinal rib therebetween, and a plurality of short transverse ribs bridging the space between said first rib and the body of the block on the outer sides of the slots, said transverse ribs terminating at their upper sides below the top of said longitudinal rib, and having such upper edges brought to a peak.

5. In combination in apparatus for drawing sheet glass, a glass drawing tank adapted to carry a bath of molten glass from which a sheet is to be drawn, means for drawing a sheet of glass upward from the bath with its plane of generation lying transversely of the bath, and a clay bar lying beneath the surface of the glass in alinement with the line of generation of the sheet and provided with a central longitudinal rib, and with a slot extending through the bar on each side of said rib and parallel thereto, the end portions of the bar on its upper side being cut away, so that the top surface of the bar at such points lies at a level below the top portion of the bar lying therebetween.

In testimony whereof, I have hereunto subscribed my name this 13th day of October, 1926.

JOSEPH S. GREGORIUS.